United States Patent
Hsia (10) Patent No.: US 10,327,298 B1
(45) Date of Patent: Jun. 18, 2019

(54) SOLID-STATE LIGHTING WITH AN ADAPTED CONTROL VOLTAGE

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 16/247,456

(22) Filed: Jan. 14, 2019

Related U.S. Application Data (63) Continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No.

(Continued)

(51) Int. Cl.
*H05B 33/08* (2006.01)
*H05B 37/02* (2006.01)

(52) U.S. Cl.
CPC ..... *H05B 33/0851* (2013.01); *H05B 33/0815* (2013.01); *H05B 33/0854* (2013.01); *H05B 37/0218* (2013.01)

(58) Field of Classification Search
None
See application file for complete search history.

(56) References Cited

U.S. PATENT DOCUMENTS

| 8,194,419 B2* | 6/2012 | Ryu | H02M 1/4208 363/21.04 |
| 9,595,875 B2* | 3/2017 | Lu | H02M 3/33523 |

(Continued)

*Primary Examiner* — Minh D A
*Assistant Examiner* — James H Cho
(74) *Attorney, Agent, or Firm* — Han IP PLLC; Andy M. Han (57) ABSTRACT

An LED luminaire comprises a power switching driver, LED array(s) powered by the power switching driver, and a detection and control circuit. The detection and control circuit comprises a voltage sensing circuit, a current sensing circuit, a voltage regulator circuit, an optocoupler circuit, and a pair of low-voltage input ports receiving an external voltage. The detection and control circuit is configured to extract an electrical signal from an output voltage, an output current driving the LED array(s), and the external voltage and to couple an optical feedback signal to the power switching driver. The external voltage comprises a voltage sent from a motion sensor, an adapted control voltage from a daylight sensor, or both to control the power switching driver to offset lighting amount of the LED luminaire to reduce energy consumption in response to changing daylight availability when a motion is detected.

20 Claims, 5 Drawing Sheets

Related U.S. Application Data 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | |
|---|---|---|---|
| 2011/0115408 A1* | 5/2011 | Fannin | H05B 33/0809 315/294 |
| 2012/0153866 A1* | 6/2012 | Liu | H02M 3/33561 315/294 |
| 2013/0169182 A1* | 7/2013 | Park | H02M 3/33507 315/219 |

* cited by examiner

SOLID-STATE LIGHTING WITH AN ADAPTED CONTROL VOLTAGE

CROSS-REFERENCE TO RELATED APPLICATIONS

The present disclosure is part of a continuation-in-part (CIP) application of U.S. patent application Ser. No. 16/208,510, filed 3 Dec. 2018, which is part of CIP application of U.S. patent application Ser. No. 16/154,707, filed 8 Oct. 2018, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) luminaires and more particularly to an LED luminaire with an adapted control voltage to automatically adjust a light level of the LED luminaire in order to reduce energy consumption in response to changing daylight availability without ambiguity.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an alternate-current (AC) mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, AC mains-operable LED lamps do not require a ballast to operate. Before use of the AC mains-operable LED lamps, the ballast in a fixture must be removed or bypassed. Removing or bypassing the ballast does not require an electrician and can be replaced by end users. Each of AC mains-operable LED lamps is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies. Moreover, the AC mains-operable LED lamps consume less power than ballast compatible LED lamps do because extra power consumed by the ballast is saved.

To further save lighting energy cost, the lighting industry proposed to use daylight harvesting years ago. In daylight harvesting, the ambient light such as natural daylight and an artificial light present in a space is utilized to reduce overhead lighting. When a sufficient ambient light level is present or when the space is unoccupied, a control mechanism in a daylight harvesting system dims or switches off the artificial light in the system. The daylight harvesting system is typically designed to maintain a recommended light level, which varies depending on activity needs in the space. For instance, the commonly recommended light level for normal office work, study library, personal computer work, groceries, show rooms, and laboratory is 500 lux on the desktop, whereas in warehouses and homes, the recommended light level is 250 lux.

The daylight harvesting system uses a photo-sensor to detect a prevailing light level in an open-loop or a closed-loop manner. The photo-sensor is used to adjust light level from electric lighting based on the available daylight in the space. In an open-loop system, the photo-sensor is used to detect the amount of available daylight only and can be positioned on the building's exterior wall or roof, or inside the building facing the window or skylight. In a closed-loop system, the photo-sensor is used to measure total photometric amount of light, from both daylight and electric lighting in the space. For instance, in an office, a closed-loop photo-sensor can be positioned on the ceiling facing the desktops in order to detect the amount of light on the work surface. In both the open- and closed-loop configurations, the signal from the photo-sensor must be calibrated to accurately show the effect of exterior daylight variations on the light level for activities in the space.

Studies have shown that by using daylight harvesting technologies, owners can have an average annual energy savings of 24%. Even with such a potential energy saving, some of daylight harvesting systems still cannot be widely accepted. In fact, impressive energy savings estimates may not be realized in practice due to a poor system design, a time-consuming calibration, or a complicated commissioning. High costs and imperfect performance of the technologies also inhibit the adoption of daylight harvesting technologies.

The AC mains-operable LED luminaires can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED luminaires that can integrate an emergency power with a normal power to operate and are capable of receiving an adapted control voltage to adjust the power of the multi-function LED luminaires and to save energy cost. It is, therefore, a motive to design such an LED luminaire with a cost-effective daylight harvesting mechanism that is simple to implement without commissioning in the field and with a plug-and-play functionality.

SUMMARY

An LED luminaire comprises one or more LED arrays, a full-wave rectifier configured to convert a line voltage from the AC mains into a first direct-current (DC) voltage, an input filter configured to suppress electromagnetic interference (EMI) noise, a power switching driver, and a detection and control circuit. The power switching driver comprises a transformer separating a primary side from a secondary side and a power factor correction (PFC) and control circuit. The power switching driver coupled to the full-wave rectifier via the input filter is configured to convert the first DC voltage into a second DC voltage with an output current driving the one or more LED arrays.

The detection and control circuit comprises a voltage sensing circuit, a current sensing circuit, a voltage regulator circuit, an optocoupler circuit, and a pair of low-voltage input ports receiving an external voltage. The detection and control circuit is configured to extract an electrical signal from the second DC voltage, the output current driving the one or more LED arrays, and the external voltage and to send an optical feedback signal to the power switching driver. The optocoupler circuit comprises an LED and a first photo-detector, wherein the LED is configured to receive the electrical signal from both the voltage sensing circuit and the current sensing circuit and to illuminate the first photo-detector. The first photo-detector is configured to receive the optical feedback signal and to control the power switching driver in a way that a combination of the LED and the first photo-detector is configured to prevent the detection and control circuit from electrically affecting an operation of the primary side of the transformer. The power switching driver is further configured to dynamically adjust the output current driving the one or more LED arrays in response to the optical feedback signal.

The voltage sensing circuit comprises a first operational amplifier, a first reference voltage, and a first voltage divider coupled to the first operational amplifier. The voltage sensing circuit is configured to firstly control a current flowing through the LED. The current sensing circuit comprises a second operational amplifier and a second voltage divider coupled to the second operational amplifier. The current sensing circuit is configured to secondly control a current flowing through the LED. The voltage regulator circuit comprises a voltage regulator and a third voltage divider coupled to the voltage regulator. The voltage regulator circuit is configured to control a second reference voltage to the second operational amplifier in response to the external voltage. The external voltage comprises a voltage sent from a motion sensor configured to detect a movement in a detection area that the motion sensor covers. When the movement is detected, the motion sensor sends a relatively high-level signal voltage to the detection and control circuit. When the movement is not detected, the motion sensor sends a relatively low-level signal voltage to the detection and control circuit.

The external voltage comprises a voltage adapted by a daylight sensor configured to offset the lighting amount of the LED luminaire in order to reduce energy consumption in response to changing daylight availability. The daylight sensor comprises a second photo-detector and a voltage adapted circuit. The voltage adapted circuit is configured to variably adjust the external voltage in a way that the external voltage is adapted when a combined light level from daylight and the LED luminaire in a detection area that the second photo-detector covers exceeds a target light level set in the daylight sensor. The second photo-detector comprises a photo-diode, a photo-transistor, or a photo-sensitive resistor. The voltage adapted circuit comprises at least one transistor configured to receive a signal from the second photo-detector and to adapt the external voltage in response to the combined light level from daylight and the LED luminaire in the detection area that the second photo-detector covers. The external voltage may comprise a combined voltage superimposed by each of a low output voltage from a motion sensor and a daylight sensor. When a movement is detected by the motion sensor, the external voltage is adapted in response to a combined light level from daylight and the LED luminaire in the detection area that the daylight sensor covers. When the movement is not detected for a specific time period set in the motion sensor, the external voltage is pulled down to a minimum, subsequently decreasing a light level from the LED luminaire to a minimum. The detection and control circuit further comprises at least one current sensing resistor coupled in series with the one or more LED arrays. The at least one current sensing resistor is configured to convert the output current driving the one or more LED arrays into a sensing voltage sent to the current sensing circuit to determine if the output current driving the one or more LED arrays exceeds a predetermined one.

The PFC and control circuit further comprises an error amplifier, a diode, and a switch. The error amplifier is configured to receive a signal from the first photo-detector and to control the switch to be turned "on" or "off" in a way that a duty cycle is decreased when the voltage sensing circuit detects that the second DC voltage exceeds a predetermined one or when the current sensing circuit detects that the output current driving the one or more LED arrays exceeds a predetermined one, so as to reduce the second DC voltage or the output current driving the one or more LED arrays.

When the external voltage is applied to the pair of low-voltage input ports of the detection and control circuit, the error amplifier controls the duty cycle according to the external voltage to increase or decrease the second DC voltage or the output current driving the one or more LED arrays. The motion sensor comprises a pair of controlled AC output coupled to the power switching driver, the pair of controlled AC output configured to turn on or shut off an AC power to the power switching driver. The external voltage may comprise a voltage from a relay circuit configured to disconnect the external voltage from entering the pair of low-voltage input ports when a line voltage from normal power AC mains is unavailable, whereas an emergency power can instead sustain to operate the LED luminaire at full power without being controlled by the external voltage. The relay circuit comprises a normal power sense circuit and two or more sets of electrical contacts. The normal power sense circuit is configured to detect if the line voltage from the normal power AC mains is available. When the line voltage from the normal AC mains is unavailable, at least one of the two or more sets of electrical contacts connect the emergency power to the power switching driver. The external voltage may comprise a nominal DC voltage of 0 to 10 volts or a nominal DC voltage of 1 to 10 volts.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF THE INVENTION

Figure 1:
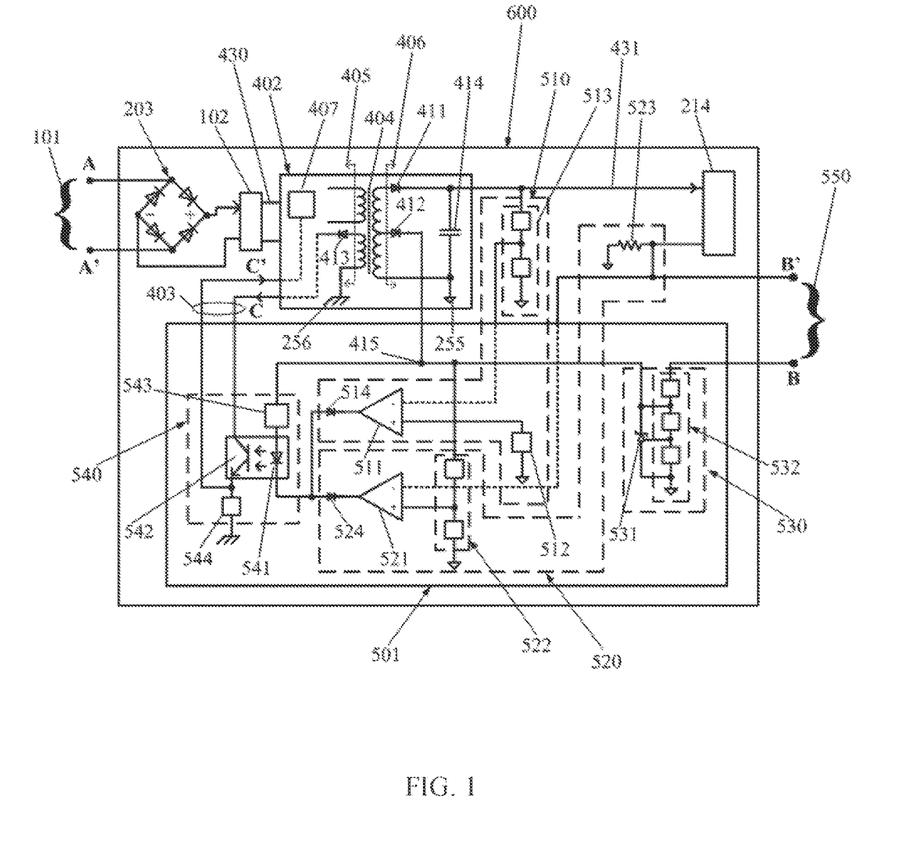
FIG. 1 is a block diagram of an LED luminaire with an adapted control voltage according to the present disclosure.

FIG. 1 is a block diagram of an LED luminaire 600 with an adapted control voltage according to the present disclosure. The LED luminaire 600 comprises one or more LED arrays 214, a full-wave rectifier 203 connected to a pair of AC power input ports 101 receiving a line voltage from the AC mains, an input filter 102, a power switching driver 402, and a detection and control circuit 501. The pair of AC power input ports 101 are also denoted as AA'. The input filter 102 is configured to suppress EMI noise. The full-wave rectifier 203 is configured to convert the line voltage from the AC mains into a first DC voltage. The power switching driver 402 comprises a transformer 404 having a primary side 405 and a secondary side 406, which is separated from the primary side 405, and a power factor correction (PFC) and control circuit 407. The power switching driver 402 is coupled to the full-wave rectifier 203 via the input filter 102 through a power input 430. The power switching driver 402 is configured to convert the first DC voltage into a second DC voltage with an output current driving the one or more LED arrays 214 via a DC output 431. The power switching driver 402 further comprises a pair of input/output ports 403, also denoted as CC', configured to provide a fourth DC voltage to the detection and control circuit 501 and to receive a divided voltage from the detection and control circuit 501.

In FIG. 1, the detection and control circuit 501 comprises a voltage sensing circuit 510, a current sensing circuit 520, a voltage regulator circuit 530, an optocoupler circuit 540, and a pair of low-voltage input/output ports 550 receiving an external voltage $V_{BB'}$ or transmitting a third DC voltage from the power switching driver 402. The pair of low-voltage input/output ports 550 are also denoted as ports BB', where a relatively high voltage potential appears at port B, and a relatively low voltage potential appears at port B'. The detection and control circuit 501 is configured to extract an electrical signal from the second DC voltage, the output current driving the one or more LED arrays 214, and the external voltage and to couple an optical feedback signal to the power switching driver 402. The optocoupler circuit 540 comprises an LED 541 and a first photo-detector 542, wherein the LED 541 is configured to receive electric current signals from both the voltage sensing circuit 510 and the current sensing circuit 520 and to illuminate the first photo-detector 542. The electric current signals are limited by a first current-limited resistor 543. The first photo-detector 542 is configured to receive the optical feedback signal and to control the power switching driver 402 in a way that a combination of the LED 541 and the first photo-detector 542 is configured to prevent the detection and control circuit 501 on the secondary side 406 of the transformer 404 from electrically affecting an operation of the primary side 405 of the transformer 404. The power switching driver 402 is further configured to dynamically adjust the second DC voltage and the output current driving the one or more LED arrays 214 in response to the optical feedback signal. Specifically, the pair of input/output ports 403 in the power switching driver 402 provides the fourth DC voltage to the first photo-detector 542 in the detection and control circuit 501 and to receive a voltage divided by a second current-limited resistor 544 and the first photo-detector 542 and to send to the PFC and control circuit 407.

In FIG. 1, the voltage sensing circuit 510 comprises a first operational amplifier 511, a first voltage reference provided by a first voltage regulator 512, a first voltage divider 513 coupled to the first operational amplifier 511, and a first diode 514 configured to control a current flowing into the first operational amplifier 511. The first voltage reference provided by the first voltage regulator 512 is inputted to a non-inverting input of the first operational amplifier 511. The first voltage divider 513 comprises two resistors connected in series at a common connection port, the first voltage divider 513 configured to monitor the second DC voltage. A sampling voltage extracted from the common connection port is sent to an inverting input of the first operational amplifier 511. The voltage sensing circuit 510 is configured to partly control a current flowing through the LED 541. The current sensing circuit 520 comprises a second operational amplifier 521, a second voltage divider 522 coupled to the second operational amplifier 521, and a second diode 524 configured to control a current flowing into the second operational amplifier 521. The second voltage divider 522 comprises two resistors connected in series at a common connection port, the second voltage divider 522 configured to monitor the third DC voltage. A sampling voltage extracted from the common connection port is sent to a non-inverting input of the second operational amplifier 521 via a port 415. The current sensing circuit 520 is configured to partly control a current flowing through the LED 541. The current sensing circuit 520 further comprises at least one current sensing resistor 523 coupled in series with the one or more LED arrays 214. The at least one current sensing resistor 523 is configured to convert the output current driving the one or more LED arrays 214 into a sensing voltage sent to the current sensing circuit 520 to determine if the output current driving the one or more LED arrays 214 exceeds a predetermined one set by the second voltage reference at the non-inverting input of the second operational amplifier 521. The voltage regulator circuit 530 comprises a second voltage regulator 531 and a third voltage divider 532 coupled to the second voltage regulator 531. The third voltage divider 532 comprises three resistors connected in series and works with the second voltage regulator 531 in such a way that the third DC voltage can appear at the pair of low-voltage input/output ports 550 when floating or the third DC voltage can be adapted to the external voltage $V_{BB'}$, so called an adapted control voltage. The voltage regulator circuit 530 is configured to work with the second voltage divider 522 to build up the second voltage reference to the second operational amplifier 521 in response to the external voltage $V_{BB'}$.

Figure 2:
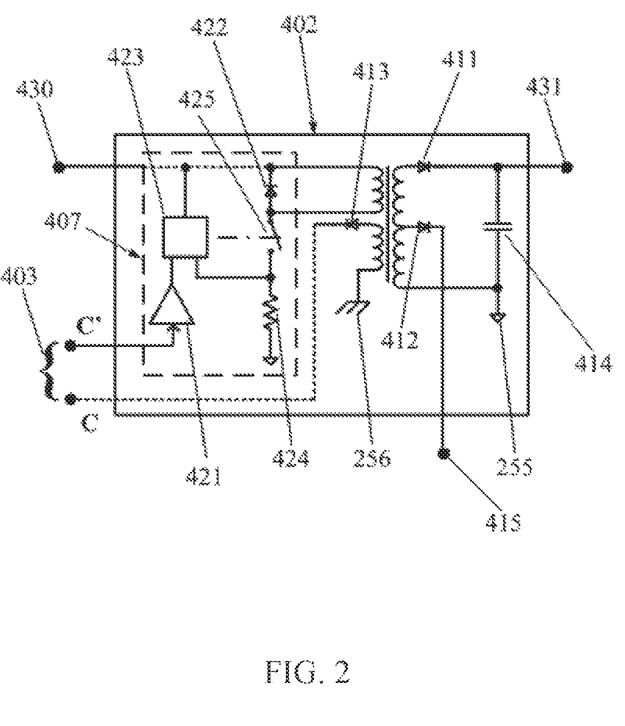
FIG. 2 is an embodiment of a power switching driver according to the present disclosure.

FIG. 2 is an embodiment of the power switching driver 402 according to the present disclosure. The power switching driver 402 comprises the power input power input 430 coupled to the input filter 102, the DC output 431 coupled to the one or more LED arrays 214, a first rectifier 411, a second rectifier 412, a third rectifier 413, and at least one output capacitor 414. The first rectifier 411 and the at least one output capacitor 414 are configured to build up the second DC voltage to drive the one or more LED arrays 214 with a first ground reference 255. The second rectifier 412 is configured to provide the third DC voltage to build up the second reference voltage via the port 415 (also in FIG. 1) to the second operational amplifier 521 and to supply power to the LED 541 in the optocoupler circuit 540 when the pair of low-voltage input/output ports 550 are floating and not connected to any of a motion sensor (in FIG. 3) and a daylight sensor (in FIGS. 3-4). The third rectifier 413 is configured to provide the fourth DC voltage relative to a second ground reference 256 to the first photo-detector 542 in the optocoupler circuit 540. The PFC and control circuit 407 comprises an error amplifier 421, a third diode 422, a controller 423, a second at least one current sensing resistor 424, and a first switch 425 controlled by the controller 423. The error amplifier 421 is configured to receive a signal from the first photo-detector 542 via the pair of input/output ports 403 and to control the first switch 425 to be turned "on" or "off" in a way that a duty cycle is decreased when the voltage sensing circuit 510 detects that the second DC voltage exceeds a predetermined one or when the current sensing circuit 520 detects that the output current driving the one or more LED arrays 214 exceeds a predetermined one, so as to reduce the second DC voltage or the output current driving the one or more LED arrays 214. That is to say, when the external voltage is applied to the pair of low-voltage input/output ports 550 of the detection and control circuit 501, the error amplifier 421 controls the duty cycle according to the external voltage to increase or decrease the second DC voltage or the output current driving the one or more LED arrays 214. As shown in FIG. 2, the second ground reference 256 and the first ground reference 255 are respectively in the primary side 405 and the secondary side 406 of the transformer 404.

Figure 3:
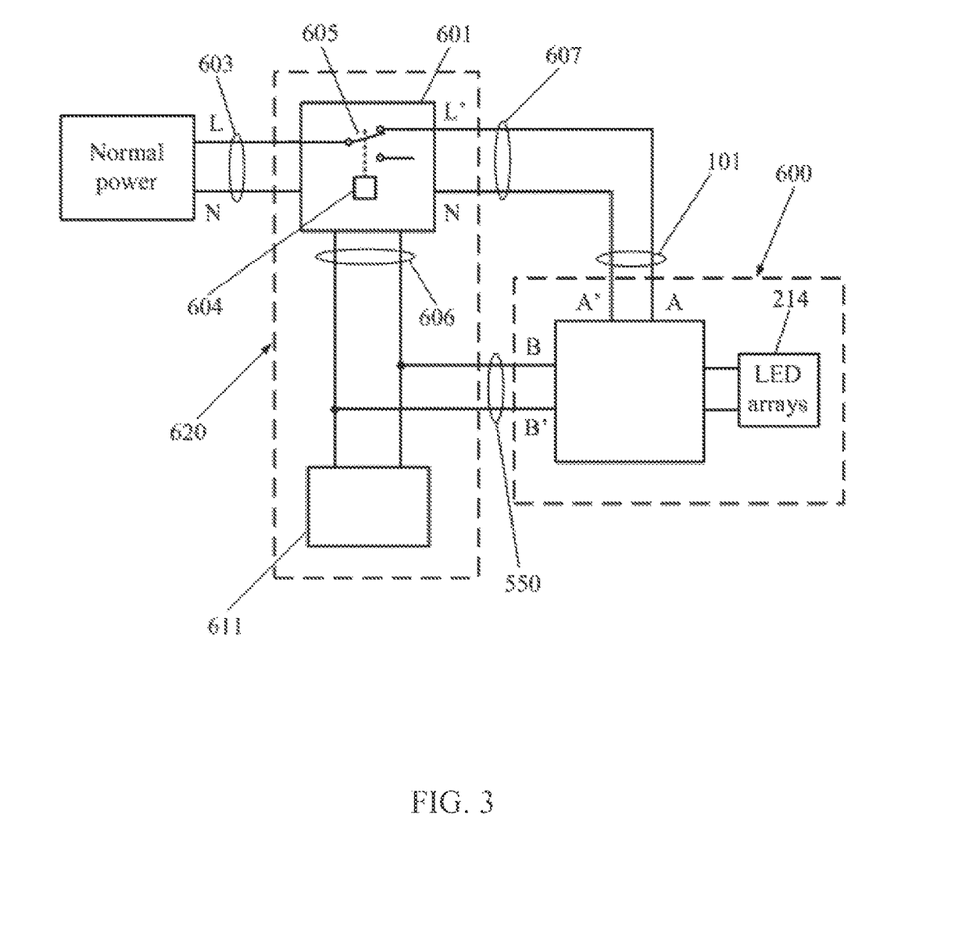
FIG. 3 is a block diagram of the LED luminaire integrated with a motion sensor and a daylight sensor in a normal power system according to the present disclosure.

FIG. 3 is a block diagram of the LED luminaire 600 integrated with a motion sensor and a daylight sensor in a normal power system according to the present disclosure. In FIG. 3, a motion sensor 601 and a daylight sensor 611 are integrated in a first level sensor assembly 620 operated in a normal power system. The external voltage $V_{BB'}$ at the pair of low-voltage input/output ports 550 comprises a combined voltage superimposed by each of output voltage from the motion sensor 601 and the daylight sensor 611. When a movement is detected by the motion sensor 601, the external voltage $V_{BB'}$ is adapted by the daylight sensor 611 in response to a combined light level from daylight and the LED luminaire 600 in the detection area that the daylight sensor 611 covers. When the movement is not detected for a specific time period set in the motion sensor 601, the external voltage $V_{BB'}$ is pulled down to a minimum specified by the motion sensor 601 and the daylight sensor 611, subsequently decreasing a light level from the LED luminaire 600 to a minimum. In FIG. 3, the motion sensor 601 comprises a pair of AC input ports 603 receiving a normal power, a motion sensing controller 604, a second switch 605 controlled by the motion sensing controller 604, a pair of low-voltage output ports 606, and a pair of AC output ports 607. The pair of AC input ports 603 are also denoted as LN whereas the pair of AC output ports 607 are also denoted as L'N. The pair of low-voltage output ports 606 is connected to the pair of low-voltage input/output ports 550 in the LED luminaire 600. The pair of AC output ports 607 connected to the switch 605 is connected to the pair of AC power input ports 101 in the LED luminaire 600. When the normal power LN is available and the motion sensor 601 detects a motion in the area the motion sensor 601 covers, the second switch 605 is enabled by the motion sensing controller 604 to couple the normal power LN to the pair of AC output ports 607 and delivers a controlled power to the pair of AC power input ports 101 denoted as AA' in the LED luminaire 600 providing the controlled power to operate the LED luminaire 600. When the normal power LN is available but the motion sensor 601 detects no motion in a long period in the area the motion sensor 601 covers, the motion sensing controller 604 controls the second switch 605 to disconnect the normal power LN to the pair of AC output ports 607, thus completely shutting off the LED luminaire 600 for conserving energy. When the normal power LN is available and the motion sensor 601 detects again a motion in the area the motion sensor 601 covers, the motion sensing controller 604 controls the second switch 605 to couple the normal power LN to the pair of AC output ports 607 and delivers the controlled power L'N to the pair of AC power input ports 101 in the LED luminaire 600 providing again the controlled power to operate the LED luminaire 600. In FIG. 3, the external voltage $V_{BB'}$ at the pair of low-voltage input/output ports 550 may comprise a voltage sent from the motion sensor 601 alone. The motion sensor 601 is configured to detect a movement in a detection area that the motion sensor 601 covers. When the movement is detected, the motion sensor 601 sends a relatively high-level signal voltage to the detection and control circuit 501 via the external voltage $V_{BB'}$. When the movement is not detected, the motion sensor 601 sends a relatively low-level signal voltage to the detection and control circuit 501 via the external voltage $V_{BB'}$. The relatively high-level signal voltage and the relatively low-level signal voltage are ultimately sent to the power switching driver 402 to adjust the second DC voltage and the output current driving the one or more LED arrays 214 to save energy. The external voltage $V_{BB'}$ may comprise a voltage adapted by the daylight sensor 611 alone. The daylight sensor 611 is configured to offset the lighting amount of the LED luminaire 600 in order to further reduce energy consumption in response to changing daylight availability.

Figure 4:
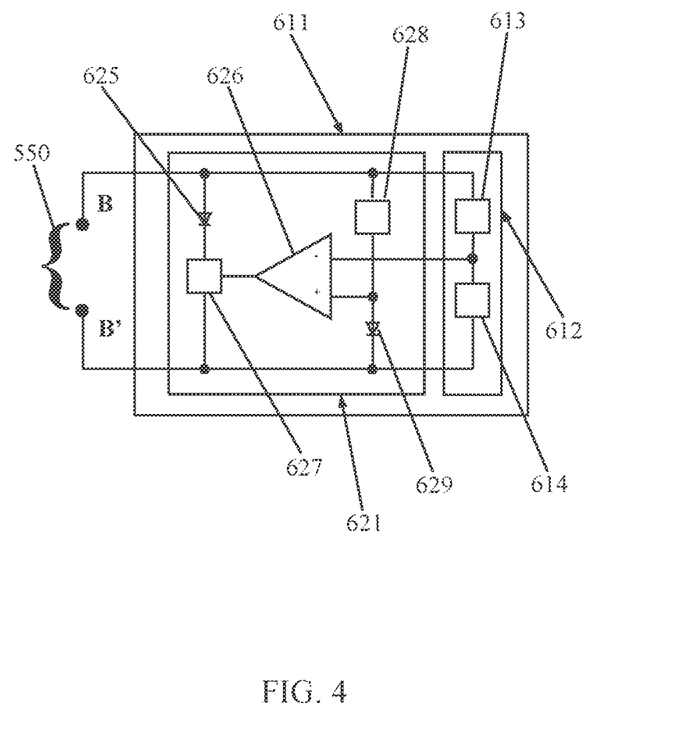
FIG. 4 is an embodiment of the daylight sensor according to the present disclosure.

FIG. 4 is an embodiment of the daylight sensor according to the present disclosure. As mentioned above, the daylight sensor 611 is configured to offset the lighting amount of the LED luminaire 600 in order to reduce energy consumption in response to changing daylight availability. In FIG. 4, the daylight sensor 611 comprises a photo detection circuit 612 and a voltage adapted circuit 621. The photo detection circuit 612 comprises a second photo-detector 613 and a variable resistor 614. The second photo-detector 613 is configured to measure the ambient light level whereas the variable resistor 614 is configured to set a target ambient light level. The voltage adapted circuit 621 comprises a fourth diode 625, a third operational amplifier 626, at least one transistor 627, a resistor 628, and a fifth diode 629. The voltage adapted circuit 621 is configured to receive a signal voltage from the photo detection circuit 612 and to adapt the external voltage $V_{BB'}$ in response to the combined light level from daylight and the LED luminaire 600 in the detection area that the second photo-detector 613 covers. In other words, the external voltage $V_{BB'}$ originally developed by the power switching driver 402 as the third DC voltage further modified by the voltage regulator circuit 530 and appeared at the pair of low-voltage input/output ports 550 (FIG. 1) can be further modified by the daylight sensor 611. The external voltage $V_{BB'}$ thus becomes an adapted control voltage to be used to control the power switching driver 402 in response to the combined light level from daylight and the LED luminaire 600. Specifically, both the resistor 628 and the fifth diode 629 set up a reference voltage at a non-inverting input of the third operational amplifier 626 whereas the signal voltage from the photo detection circuit 612 is inputted to an inverting input of the third operational amplifier 626. When the ambient light level is increased, an internal resistance in the second photo-detector 613 is decreased. The signal voltage from the photo detection circuit 612 inputted to the inverting input of the third operational amplifier 626 tends to increase its magnitude. The third operational amplifier 626 then controls its output voltage to be less than the external voltage $V_{BB'}$, which puts the at least one transistor 627 in a forward-active region of its output characteristics. The external voltage $V_{BB'}$ is thereby adapted to a new lower value, and then the detection and control circuit 501 detects such a new lower external voltage $V_{BB'}$ and controls the power switching driver 402 to decrease the output current driving the one or more LED arrays 214, thus reducing energy consumption in response to the ambient light level. When the external voltage $V_{BB'}$ becomes lower, the reference voltage at the non-inverting input of the third operational amplifier 626 is lower. The signal voltage from the photo detection circuit 612 inputted to the inverting input of the third operational amplifier 626 is lower not only because the external voltage $V_{BB'}$ is lower but because the ambient light level is lower due to a decreased output current driving the one or more LED arrays 214. This kind of closed-loop control ends up with a stabilized illumination from the LED luminaire 600. In other words, the voltage adapted circuit 621 is configured to variably adjust the external voltage $V_{BB'}$ in a way that the external voltage $V_{BB'}$ is adapted when a combined light level from daylight and the LED luminaire in a detection area that the second photo-detector 603 covers exceeds a target light level set by the variable resistor 614. The second photo-detector 613 may comprise a photo-diode, a photo-transistor, or a photo-sensitive resistor. The preferred one is the photo-diode for its high sensitivity.

Figure 5:
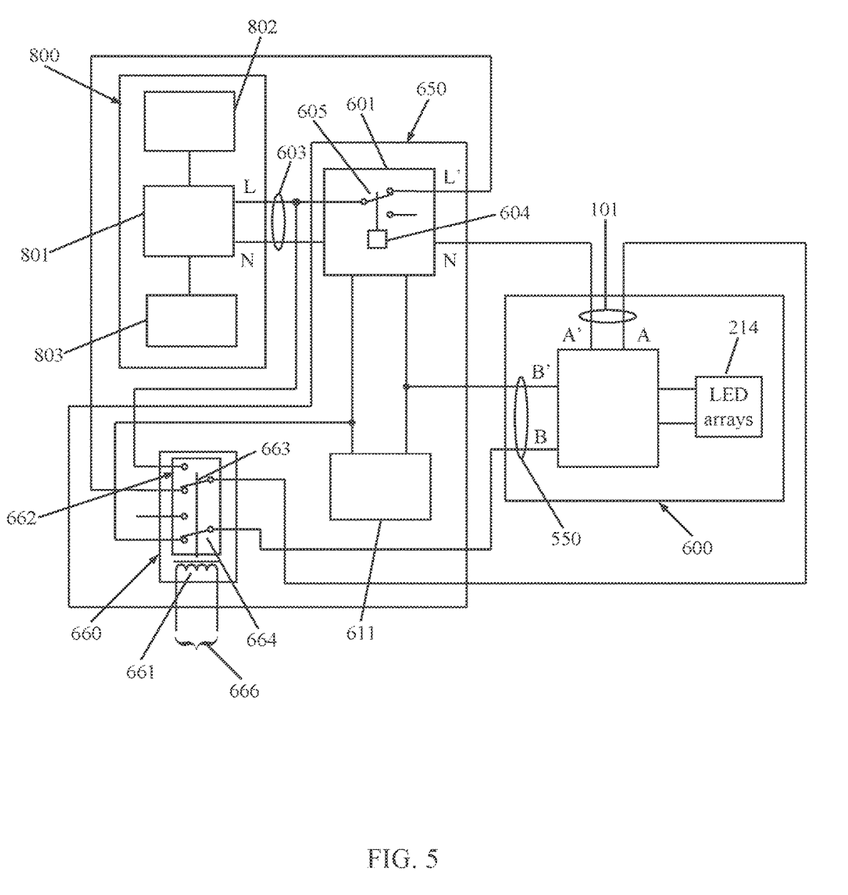
FIG. 5 is a block diagram of the LED luminaire integrated with a sensor assembly powered by a normal and emergency power system according to the present disclosure.

FIG. 5 is a block diagram of the LED luminaire 600 integrated with a sensor assembly powered by a normal and emergency power system 800 according to the present disclosure. The normal and emergency power system 800 comprises a transfer switch 801 that automatically selects a normal power 802 or an emergency power 803 based on the normal power availability. The sensor assembly 650 comprises the motion sensor 601, the daylight sensor 611, and a relay circuit 660. The relay circuit 660 comprises a normal power sense circuit 661 receiving a normal power via ports 666 and two or more sets of electrical contacts 662 comprising a first set of electrical contacts 663 and a second set of electrical contacts 664. Each of the first set of electrical contacts 663 and the second set of electrical contacts 664 comprises a normally-open (NO) lower contact, a normally-closed (NC) upper contact, and a common central contact. When the line voltage from the normal power AC mains is available, the normal power sense circuit 661 operates to enable each NO lower contact of the first set of electrical contacts 663 and the second set of electrical contacts 664 to connect to the common central contact. In this case, the first set of electrical contacts 663 connect the line voltage L' from the controlled AC mains to one of the pair of AC power input ports, A, whereas the second set of electrical contacts 664 connect the relatively high voltage potential from the motion sensor 601 and the daylight sensor 611 to one of the pair of low-voltage input/output ports 550, B in the LED luminaire 600. On the other hand, when the line voltage from the normal power AC mains is unavailable, the normal power sense circuit 661 is disabled, which enables each NC upper contact of the first set of electrical contacts 663 and the second set of electrical contacts 664 to connect to the common central contact. In this case, the first set of electrical contacts 663 connect the line voltage L from the emergency power 802 to the one of the pair of AC power input ports, A, whereas the second set of electrical contacts 664 connect nothing to the one of the pair of low-voltage input/output ports 550, B in the LED luminaire 600. In this case, the controlled AC mains from the motion sensor 601 and the adapted low-voltage from the motion sensor 601 and the daylight sensor 611 are all disabled. This means that when the line voltage from the normal power AC mains is unavailable, the LED luminaire 600 receives only the line voltage from the emergency power 802 to illuminate at full power with the motion sensor 601 and the daylight sensor 611 completely bypassed for such an emergency application. In other words, the relay circuit 660 is configured to disconnect the external voltage from entering the pair of low-voltage input/output ports 550 when the line voltage from the AC mains is unavailable, whereas the emergency power from the transfer switch 801 can sustain to operate the LED luminaire 600 at full power without being controlled by the external voltage. The external voltage may comprise a nominal DC voltage of 0 to 10 volts or a nominal DC voltage of 1 to 10 volts.

Whereas preferred embodiments of the present disclosure have been shown and described, it will be realized that alterations, modifications, and improvements may be made thereto without departing from the scope of the following claims. Another kind of schemes with an adapted control voltage adopted in an LED luminaire using various kinds of combinations to accomplish the same or different objectives could be easily adapted for use from the present disclosure. Accordingly, the foregoing descriptions and attached drawings are by way of example only, and are not intended to be limiting.

What is claimed is:

1. A light-emitting diode (LED) luminaire, comprising:
   one or more LED arrays;
   a full-wave rectifier configured to convert a line voltage from alternate-current (AC) mains into a first direct-current (DC) voltage;
   an input filter configured to suppress an electromagnetic interference (EMI) noise;
   a power switching driver comprising a transformer having a primary side and a secondary side, which is separated from the primary side, and a power factor correction (PFC) and control circuit, the power switching driver coupled to the full-wave rectifier, via the input filter, and configured to convert the first DC voltage into a second DC voltage with an output current driving the one or more LED arrays; and
   a detection and control circuit comprising a voltage sensing circuit, a current sensing circuit, a voltage regulator circuit, an optocoupler circuit, and a pair of low-voltage input/output ports receiving an external voltage, the detection and control circuit configured to extract an electrical signal from the second DC voltage, the output current driving the one or more LED arrays, and the external voltage and to couple an optical feedback signal to the power switching driver;
   wherein:
   the optocoupler circuit comprises an LED and a first photo-detector;
   the LED is configured to receive the electrical signal from both the voltage sensing circuit and the current sensing circuit and to illuminate the first photo-detector;
   the first photo-detector is configured to receive the optical feedback signal and to control the power switching driver;
   a combination of the LED and the first photo-detector is configured to prevent the detection and control circuit from electrically affecting an operation in the primary side of the transformer; and
   the power switching driver is further configured to dynamically adjust the output current driving the one or more LED arrays in response to the optical feedback signal.

2. The LED luminaire of claim 1, wherein the voltage sensing circuit comprises a first operational amplifier, a first voltage reference, a first voltage divider coupled to the first operational amplifier, and a first diode, the voltage sensing circuit configured to partly control a current flowing through the LED.

3. The LED luminaire of claim 1, wherein the current sensing circuit comprises a second operational amplifier, a second voltage divider coupled to the second operational amplifier, and a second diode, the current sensing circuit configured to partly control a current flowing through the LED.

4. The LED luminaire of claim 1, wherein the voltage regulator circuit comprises a voltage regulator and a third voltage divider coupled to the voltage regulator, the voltage regulator circuit configured to control a second voltage reference to the second operational amplifier in response to the external voltage.

5. The LED luminaire of claim 1, wherein the external voltage comprises a voltage sent from a motion sensor configured to detect a movement in a detection area that the motion sensor covers, wherein, when the movement is detected, the motion sensor sends a relatively high-level signal voltage to the detection and control circuit, and wherein, when the movement is not detected, the motion sensor sends a relatively low-level signal voltage to the detection and control circuit.

6. The LED luminaire of claim 5, further comprising the motion sensor, wherein the motion sensor comprises a pair of controlled AC output coupled to the power switching driver, the pair of controlled AC output configured to turn on or shut off an AC power to the power switching driver.

7. The LED luminaire of claim 1, wherein the external voltage comprises an adapted control voltage sent from a daylight sensor configured to offset lighting amount of the LED luminaire in order to reduce energy consumption in response to changing daylight availability.

8. The LED luminaire of claim 7, wherein the daylight sensor comprises a second photo-detector, a voltage adapted circuit, and a variable resistor, the voltage adapted circuit configured to variably adjust the external voltage when a combined light level from daylight and the LED luminaire in a detection area that the second photo-detector covers differs from a target light level set by the variable resistor.

9. The LED luminaire of claim 8, wherein the second photo-detector comprises a photo-diode, a photo-transistor, or a photo-sensitive resistor.

10. The LED luminaire of claim 8, wherein the voltage adapted circuit comprises a third operational amplifier receiving a signal from the second photo-detector, at least one diode, and at least one transistor, the at least one transistor configured to receive a signal from the third operational amplifier and to create the adapted control voltage in response to the combined light level from daylight and the LED luminaire in the detection area that the second photo-detector covers.

11. The LED luminaire of claim 1, wherein the external voltage comprises a combined voltage superimposed by each of a low output voltage from a motion sensor and a daylight sensor, wherein when a movement is detected by the motion sensor, the external voltage is variably adjusted in response to a combined light level from daylight and the LED luminaire in the detection area that the daylight sensor covers, and wherein when the movement is not detected for a specific time period set in the motion sensor, the external voltage is pulled down to a minimum, subsequently decreasing a light level from the LED luminaire to a minimum.

12. The LED luminaire of claim 1, wherein the current sensing circuit further comprises a first at least one current sensing resistor coupled in series with the one or more LED arrays, the at least one current sensing resistor configured to convert the output current driving the one or more LED arrays into a sensing voltage sent to the current sensing circuit to control a current flowing through the LED.

13. The LED luminaire of claim 1, wherein the PFC and control circuit further comprises an error amplifier, a third diode, a first switch, and a second at least one current sensing resistor coupled in series with the first switch, the error amplifier configured to receive a signal from the first photo-detector and to control the first switch to be turned on or off in a way that a duty cycle is variably adjusted to increase or decrease the second DC voltage or the output current driving the one or more LED arrays.

14. The LED luminaire of claim 1, wherein the power switching driver further comprises a first rectifier and at least one output capacitor, and wherein the first rectifier and the at least one output capacitor are configured to build up the second DC voltage to drive the one or more LED arrays.

15. The LED luminaire of claim 1, wherein the power switching driver further comprises a second rectifier configured to provide a third DC voltage to build up a voltage reference to the second operational amplifier and to supply power to the LED in the optocoupler circuit when the pair of low-voltage input/output ports are floating.

16. The LED luminaire of claim 1, wherein the power switching driver further comprises a third rectifier configured to provide a fourth DC voltage to operate the first photo-detector.

17. The LED luminaire of claim 1, wherein the external voltage comprises a voltage sent from a relay circuit configured to disconnect the external voltage from entering the pair of low-voltage input/output ports when a line voltage from normal power AC mains is unavailable, and wherein an emergency power can sustain to operate the LED luminaire at full power without being controlled by the external voltage.

18. The LED luminaire of claim 17, further comprising the relay circuit, wherein the relay circuit comprises a normal power sense circuit and two or more sets of electrical contacts, wherein the normal power sense circuit detects whether the line voltage from the normal power AC mains is available or not, and wherein when the line voltage from the normal power AC mains is unavailable, at least one of the two or more sets of electrical contacts connect the emergency power to the power switching driver.

19. The LED luminaire of claim 1, wherein the external voltage comprises a nominal DC voltage in a range from 0 to 10 volts.

20. The LED luminaire of claim 1, wherein the external voltage comprises a nominal DC voltage in a range from 1 to 10 volts.

* * * * *